(12) United States Patent
Song et al.

(10) Patent No.: US 11,342,622 B2
(45) Date of Patent: May 24, 2022

(54) BATTERY PACK

(71) Applicant: SAMSUNG SDI CO., LTD., Yongin-si (KR)

(72) Inventors: Jang Hyun Song, Yongin-si (KR); Myung Chul Kim, Yongin-si (KR)

(73) Assignee: SAMSUNG SDI CO., LTD., Yongin-si (KR)

( * ) Notice: Subject to any disclaimer, the term of this patent is extended or adjusted under 35 U.S.C. 154(b) by 0 days.

(21) Appl. No.: 16/347,235

(22) PCT Filed: Sep. 21, 2017

(86) PCT No.: PCT/KR2017/010367
§ 371 (c)(1),
(2) Date: May 3, 2019

(87) PCT Pub. No.: WO2018/088691
PCT Pub. Date: May 17, 2018

(65) Prior Publication Data
US 2019/0334138 A1    Oct. 31, 2019

(30) Foreign Application Priority Data

Nov. 8, 2016 (KR) .................. 10-2016-0148218

(51) Int. Cl.
*H01M 50/20* (2021.01)
*H01M 50/24* (2021.01)
(Continued)

(52) U.S. Cl.
CPC ....... *H01M 50/20* (2021.01); *H01M 10/0431* (2013.01); *H01M 50/24* (2021.01);
(Continued)

(58) Field of Classification Search
CPC .................................................. H01M 50/20
See application file for complete search history.

(56) References Cited

U.S. PATENT DOCUMENTS

2011/0294000 A1    12/2011    Kim et al.
2012/0171553 A1     7/2012    Guen et al.
(Continued)

FOREIGN PATENT DOCUMENTS

CN    102263213 A    11/2011
CN    103325977 A     9/2013
(Continued)

OTHER PUBLICATIONS

International Search Report dated Dec. 14, 2017 for PCT/KR2017/010367 filed on Sep. 21, 2017.
(Continued)

*Primary Examiner* — Brian R Ohara
(74) *Attorney, Agent, or Firm* — Lee IP Law, P.C.

(57) ABSTRACT

Disclosed is a battery pack comprising: a plurality of battery cells, each including an upper surface through which a pair of electrode terminals are protruded, a lower surface facing the upper surface, and a pair of long side surfaces and a pair of short side surfaces among surfaces connecting the upper surface and the lower surface, the long side surfaces having a relatively large area, and the short side surfaces having a relatively small area; and a cell frame that receives the battery cells, exposes the upper surfaces of the battery cells, and includes side plates for supporting the short side surfaces of the plurality of battery cells and end plates positioned at opposite ends to support the long side surfaces of the battery cells, wherein the end plates include protrusions protruding in a direction opposite to a direction in which the end plates faces long side surfaces of the battery cells at the opposite ends; and a recess located between the protrusions, depressed in a direction of long side surfaces of the battery cells, and providing an extra space for swelling.

17 Claims, 7 Drawing Sheets

(51) Int. Cl.
  *H01M 50/538*   (2021.01)
  *H01M 50/543*   (2021.01)
  *H01M 10/04*    (2006.01)

(52) U.S. Cl.
  CPC ....... *H01M 50/538* (2021.01); *H01M 50/543* (2021.01); *H01M 2200/00* (2013.01); *H01M 2220/20* (2013.01)

(56) References Cited

U.S. PATENT DOCUMENTS

| | | |
|---|---|---|
| 2012/0208069 A1 | 8/2012 | Kim |
| 2013/0252063 A1 | 9/2013 | Park |
| 2014/0120391 A1 | 5/2014 | Park |
| 2015/0064541 A1 | 3/2015 | Noh et al. |
| 2015/0140406 A1 | 5/2015 | Kim et al. |
| 2016/0093849 A1* | 3/2016 | DeKeuster ........ H01M 10/0525 429/61 |
| 2016/0190526 A1 | 6/2016 | Yamada et al. |

FOREIGN PATENT DOCUMENTS

| | | |
|---|---|---|
| EP | 2 323 194 A1 | 5/2011 |
| EP | 2 475 023 A1 | 7/2012 |
| JP | 2016-122572 A | 7/2016 |
| KR | 10-0194913 B1 | 6/1999 |
| KR | 10-2007-0099843 A | 10/2007 |
| KR | 10-2011-0007341 A | 1/2011 |
| KR | 10-2012-0079612 A | 7/2012 |
| KR | 10-2012-0093646 A | 8/2012 |
| KR | 10-2015-0024724 A | 3/2015 |
| KR | 10-2015-0057261 A1 | 5/2015 |
| KR | 10-2015-0115251 A | 10/2015 |

OTHER PUBLICATIONS

Extended European Search Report dated Jun. 15, 2020 of the corresponding European Patent Application No. 17868699.4.
Korean Office Action dated Aug. 4, 2021 for corresponding Korean Patent Application No. 10-2019-7007826.
Chinese Office Action dated Apr. 20, 2021 for corresponding Chinese Patent Application No. 201780067512.1.

* cited by examiner

BATTERY PACK

CROSS-REFERENCE TO THE RELATED APPLICATION

This is the U.S. national phase application based on PCT Application No. PCT/KR2017/010367, filed Sep. 21, 2017, which is based on Korean Patent Application No. 10-2016-0148218, filed Nov. 8, 2016, the entire contents of all of which are hereby incorporated by reference.

TECHNICAL FIELD

The present invention relates to a battery pack.

BACKGROUND ART

In general, unlike a primary battery that cannot be charged, a secondary battery can be charged and discharged. A low-capacity secondary battery packaged in the form of a pack comprised of one single cell is used as the power source for various portable small-sized electronic devices, such as mobile phones, camcorders, and so on. A high-capacity secondary battery in which several tens of cells are connected in a battery pack is used as the power source for motor drives, such as those in electric bicycles, electric scooters, hybrid vehicles, or electric vehicles.

Small-sized mobile devices, such as cellular phones, can be operated for a predetermined period of time using the output and capacity of a single battery. However, when a long time operation or a high power operation is required, like in an electric vehicle or a hybrid vehicle, use of a battery pack or a battery module is preferred from the view point of output or capacity, and an output voltage or current can be increased by increasing the number of battery cells included in the battery pack. Here, the battery pack requires a connection structure for forming an assembly by structurally combining a plurality of battery cells.

Technical Problems to be Solved

The present invention provides a battery pack, which does not affect the overall outline dimension of a battery pack module even if the battery pack is inflated due to swelling in the course of assembling two or more battery cells to form the battery module.

Technical Solutions

In accordance with an aspect of the present invention, the above and other objects can be accomplished by providing a battery pack including a plurality of battery cells, each including an upper surface through which a pair of electrode terminals are protruded, a lower surface facing the upper surface, and a pair of long side surfaces and a pair of short side surfaces among surfaces connecting the upper surface and the lower surface, the long side surfaces having a relatively large area, and the short side surfaces having a relatively small area, and a cell frame that receives the battery cells, exposes the upper surfaces of the battery cells, and includes side plates for supporting the short side surfaces of the plurality of battery cells and end plates positioned at opposite ends to support the long side surfaces of the battery cells, wherein the end plates include protrusions protruding in a direction opposite to a direction in which the end plates face long side surfaces of the battery cells at the opposite ends, and a recess located between the protrusions, depressed in a direction of long side surfaces of the battery cells, and providing an extra space for swelling.

The end plates may include cylindrical supports located in the protrusions to fixedly support the battery pack to an external device, and the supports may have cut portions located near to the battery cells to have planes parallel with the long side surfaces of the battery cells.

Alternatively, the recess of the end plates may include several embossed creases located in the same direction, and a distance between each of the long side surfaces of the battery pack and the outermost one of the embossed creases is smaller than a distance between each of the long side surfaces of the battery pack and each of the protrusions.

Preferably, the protrusions of the end plates may include extending parts located to extend toward the side plates, the extending parts overlapping with regions of the side plates. In addition, the extending parts of the end plates and the regions overlapping with the side plates may be located at exterior sides of the battery cells.

The battery cells may be prismatic secondary batteries, and each of the battery cells may be provided by winding an electrode assembly including a first electrode plate, a second electrode plate and a separator positioned between the first electrode plate and the second electrode plate.

Preferably, the cell frame may accommodate the battery cells such that lower surfaces of the battery cells face a bottom side of the cell frame to upwardly expose upper surfaces of the battery cells, short side surfaces of the battery cells face side plates of the cell frame, and long side surfaces of the outermost one among the battery cells face the end plates of the cell frame. In addition, the cell frame may include a plurality of internal partitions for independently accommodating the battery cells.

Advantageous Effects

As described above, in the battery pack according to an embodiment of the present invention, since increased volumes of battery cells swollen when the battery cells are inflated due to swelling can be absorbed in a recess located in end plates of a cell frame, there is no change in the overall outline dimension of the battery pack.

BRIEF DESCRIPTION OF DRAWINGS

FIGS. 6(*a*) and 6(*b*) illustrate views for comparison of swelling phenomena occurring to the battery pack according to an embodiment of the present invention and a conventional battery pack.

BEST MODE FOR CARRYING OUT THE INVENTION

Hereinafter, a preferred embodiment of the present invention will be described in detail.

Various embodiments of the present invention may be embodied in many different forms and should not be construed as being limited to the example embodiments set forth herein. Rather, these example embodiments of the disclosure are provided so that this disclosure will be thorough and complete and will convey inventive concepts of the disclosure to those skilled in the art.

In the accompanying drawings, sizes or thicknesses of various components are exaggerated for brevity and clarity. Like numbers refer to like elements throughout. As used herein, the term "and/or" includes any and all combinations of one or more of the associated listed items. In addition, it will be understood that when an element A is referred to as being "connected to" an element B, the element A can be directly connected to the element B or an intervening element C may be present and the element A and the element B are indirectly connected to each other.

The terminology used herein is for the purpose of describing particular embodiments only and is not intended to be limiting of the disclosure. As used herein, the singular forms are intended to include the plural forms as well, unless the context clearly indicates otherwise. It will be further understood that the terms "comprise or include" and/or "comprising or including," when used in this specification, specify the presence of stated features, numbers, steps, operations, elements, and/or components, but do not preclude the presence or addition of one or more other features, numbers, steps, operations, elements, components, and/or groups thereof.

It will be understood that, although the terms first, second, etc. may be used herein to describe various members, elements, regions, layers and/or sections, these members, elements, regions, layers and/or sections should not be limited by these terms. These terms are only used to distinguish one member, element, region, layer and/or section from another. Thus, for example, a first member, a first element, a first region, a first layer and/or a first section discussed below could be termed a second member, a second element, a second region, a second layer and/or a second section without departing from the teachings of the present disclosure.

Spatially relative terms, such as "below," "beneath," "lower," "above," "upper," and the like, may be used herein for ease of description to describe one element or feature's relationship to another element(s) or feature(s) as illustrated in the figures. It will be understood that the spatially relative terms are intended to encompass different orientations of the device in use or operation in addition to the orientation depicted in, the figures. For example, if the device in the figures is turned over, elements described as "below" or "beneath" other elements or features would then be oriented "on" or "above" the other elements or features. Thus, the exemplary term "below" can encompass both an orientation of above and below.

Figure 1:
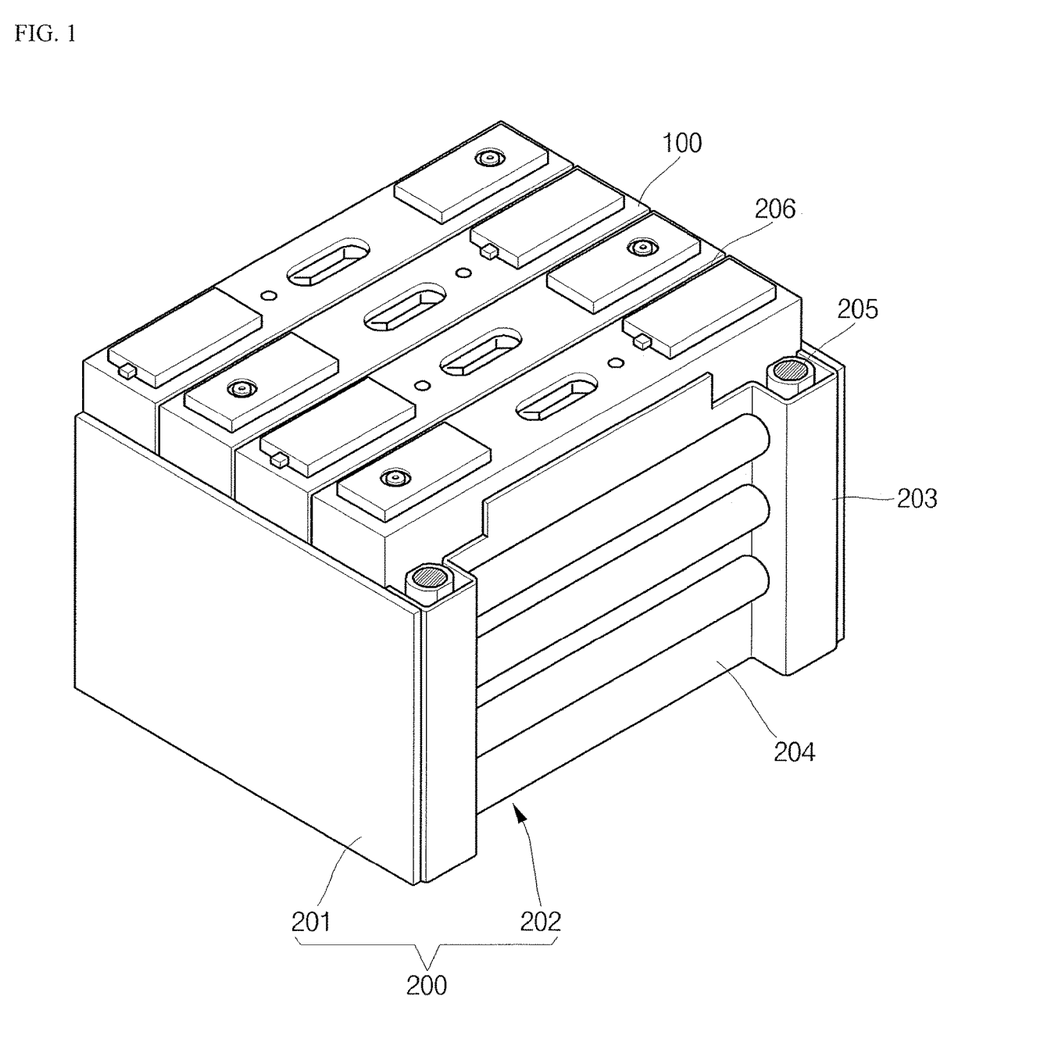
FIG. 1 is a perspective view of a battery pack according to an embodiment of the present invention.
Figure 2A:
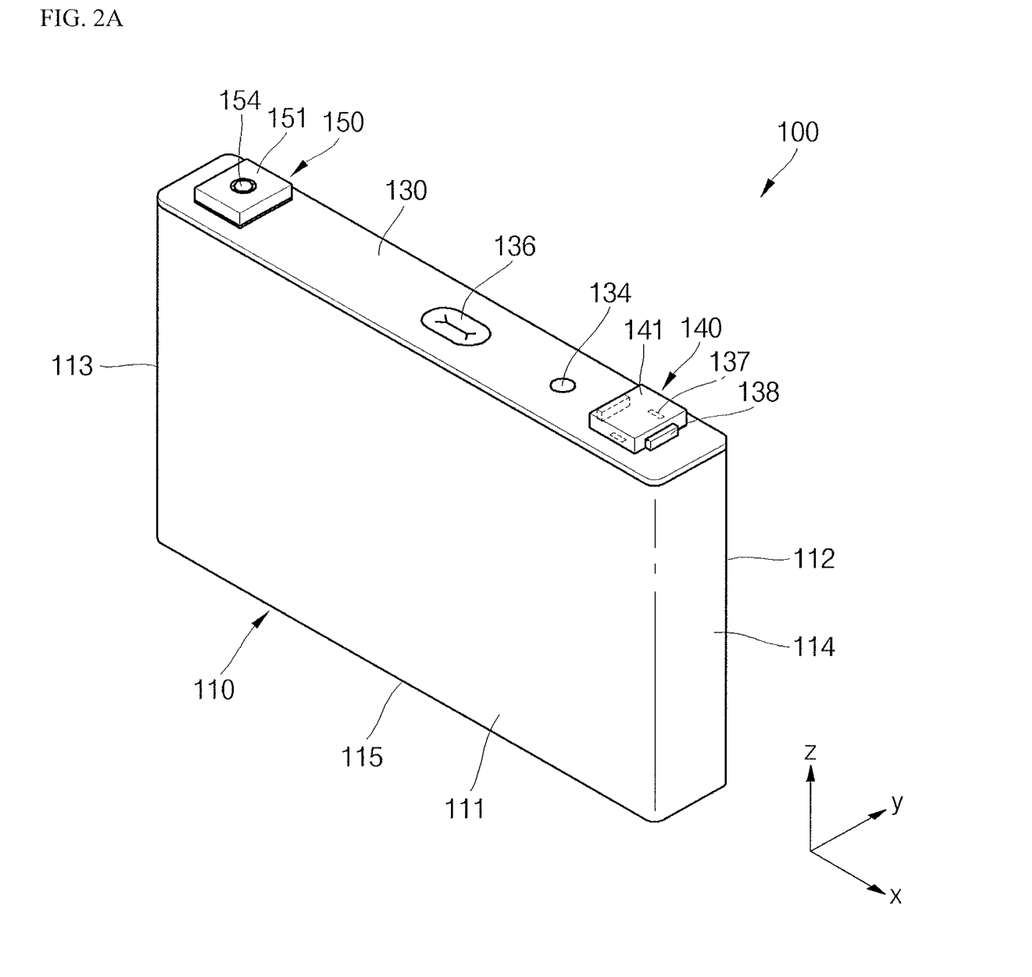
FIGS. 2A, 2B and 2C area perspective view, a cross-sectional view and an exploded perspective view of a cell in the battery pack according to an embodiment of the present invention.
Figure 2B:
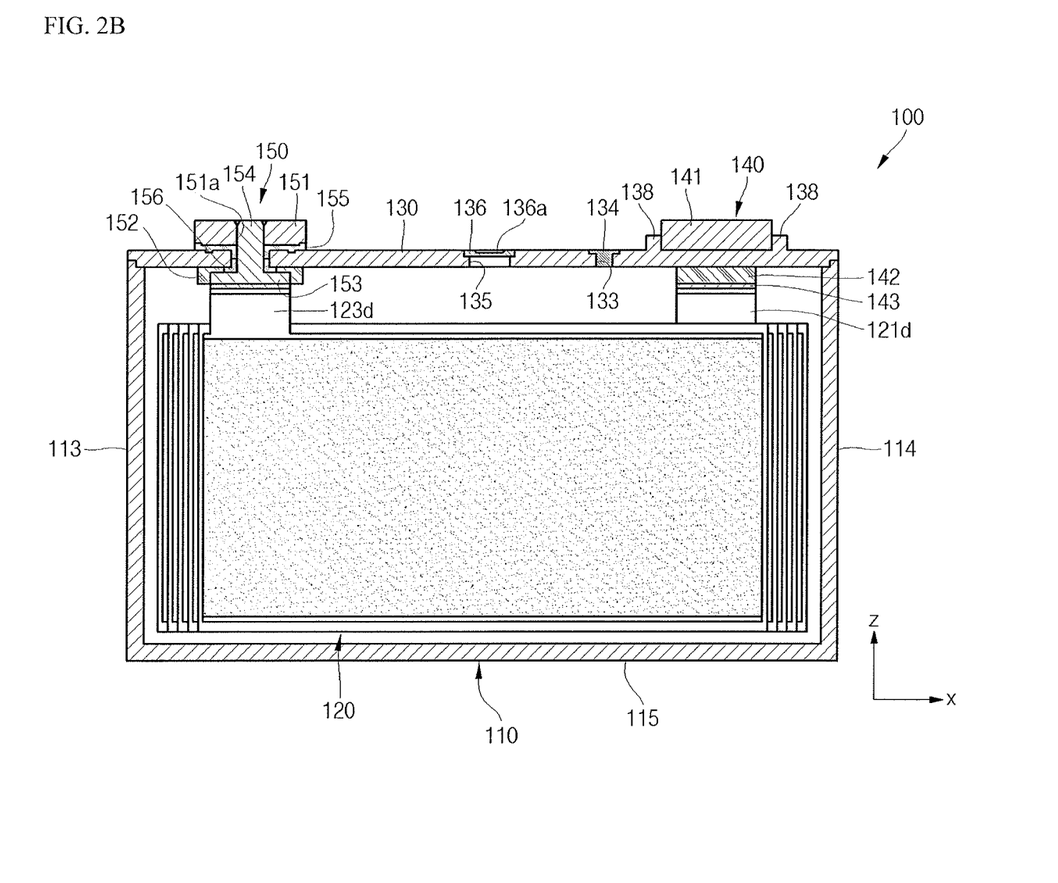
Figure 2C:
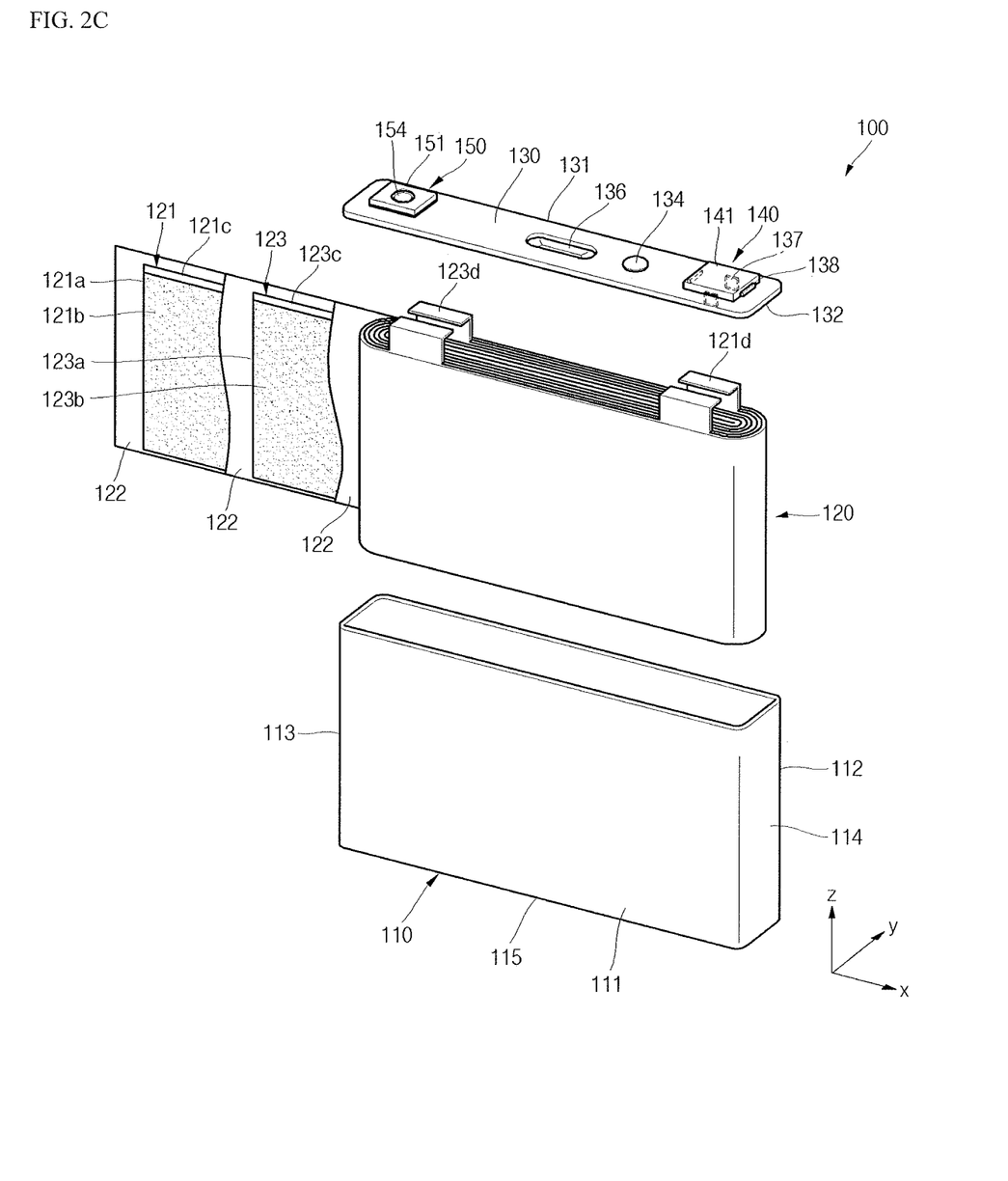
Figure 3:
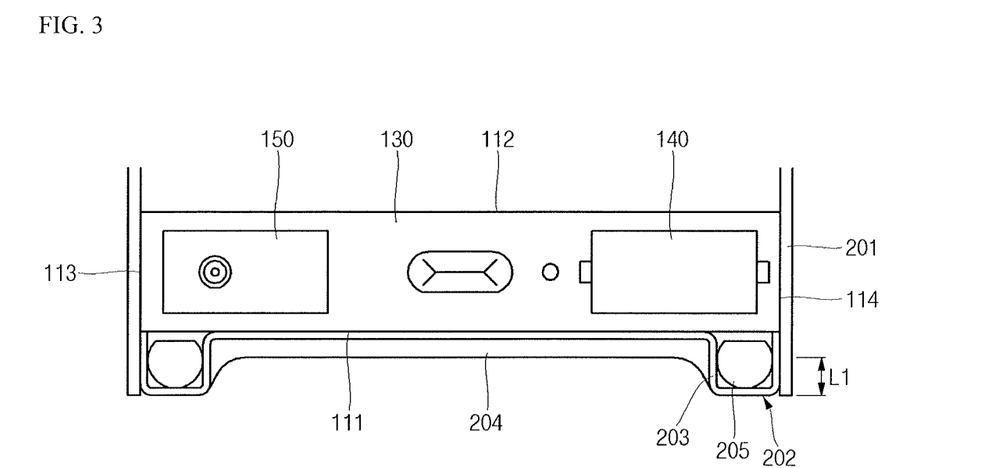
FIG. 3 is a cross-sectional view of end plates of the battery pack according to an embodiment of the present invention.
Figure 4:
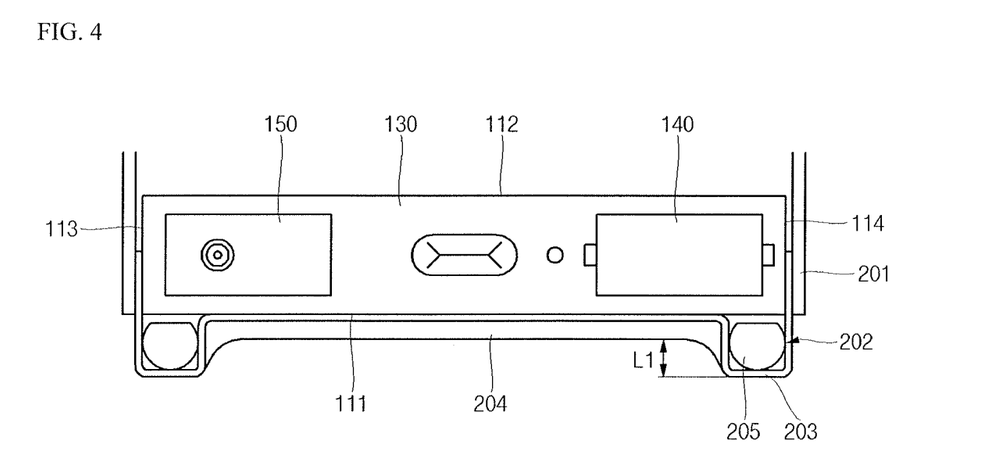
FIG. 4 is a cross-sectional view of end plates of the battery pack according to another embodiment of the present invention.
Figure 5:
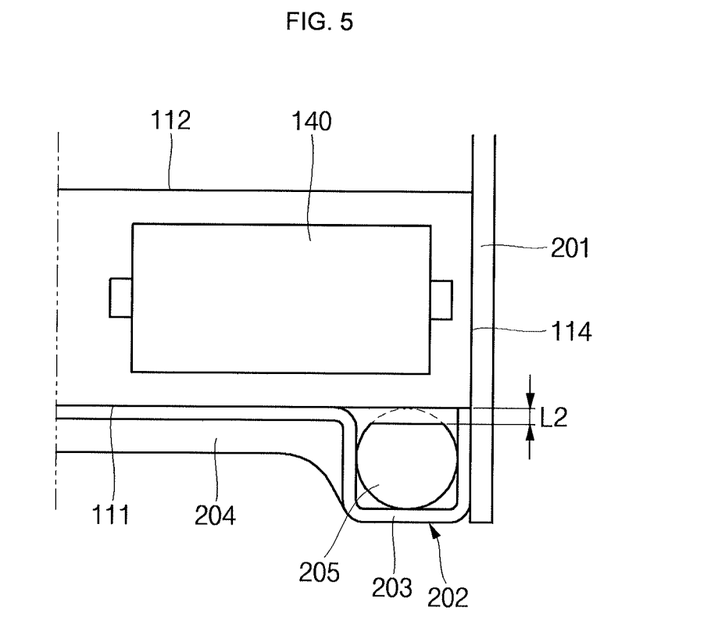
FIG. 5 is an enlarged cross-sectional view of a portion around a protrusion of the battery pack according to an embodiment of the present invention.
Figures 6A, 6B:
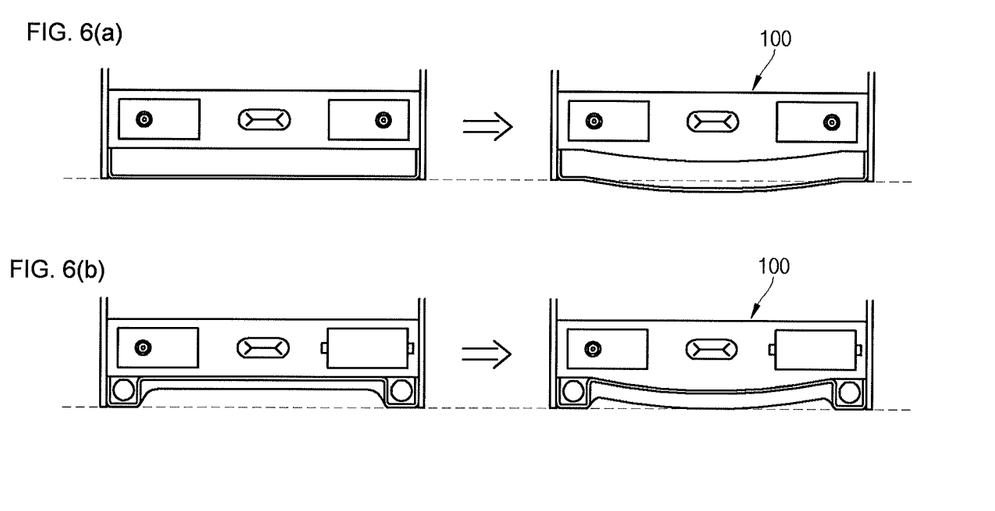

FIG. 1 is a perspective view of a battery pack according to an embodiment of the present invention. FIGS. 2A, 2B and 2C are a perspective view, a cross-sectional view and an exploded perspective view of a cell in the battery pack according to an embodiment of the present invention. FIG. 3 is a cross-sectional view of end plates of the battery pack according to an embodiment of the present invention. FIG. 4 is a cross-sectional view of end plates of the battery pack according to another embodiment of the present invention. FIG. 5 is an enlarged cross-sectional view of a portion around a protrusion of the battery pack according to an embodiment of the present invention. FIGS. 6(a) and 6(b) illustrate views for comparison of swelling phenomena occurring to the battery pack according to an embodiment of the present invention and a conventional battery pack.

Only a first half of the battery pack is shown in FIG. 1. That is to say, a cell frame configuration according to an embodiment of the present invention can be applied to not only to the first half of the battery pack but also to a second half of the battery pack.

Referring to FIGS. 1 to 6(b), the battery pack according to an embodiment of the present invention includes a plurality of battery cells 100 and a cell frame 200 around the plurality of battery cells 100.

The battery cells 100 may include a case 110 and an electrode assembly 120 accommodated in the case 110. While the illustrated battery cells 100 are prismatic batteries, aspects of the present invention are not limited thereto. In some cases, pouch-type batteries may be used as the battery cells 100. That is to say, the battery cells 100 disclosed herein are just provided by way of example for a better understanding of the present invention, and the present invention does not limit the battery cell structure to that disclosed herein.

As illustrated in FIGS. 2A to 2C, each of the battery cells 100 may include a case 110, an electrode assembly 120, a cap plate 130, a first terminal 140 and a second terminal 150.

The case 110 includes a conductive metal, such as aluminum, an aluminum alloy or nickel plated steel, and has a substantially hexahedral shape to have a hollow opening to allow the electrode assembly 120 to be inserted and placed. Since the case 110 and the cap plate 130 coupled to each other is illustrated in FIG. 2B, the opening is not shown. However, the opening is a portion of a top portion of the case 110, which is substantially opened. Meanwhile, an interior surface of the case 110 is insulated so that the case 110 is insulated from the electrode assembly 120. Here, the case 110 may also be referred to as a can in some cases.

In addition, the case 110 includes first and second long side surfaces 111 and 112 facing each other and spaced a predetermined distance apart from each other while, first and second short side surfaces 113 and 114 facing each other, spaced a predetermined distance apart from each other and connected to the first and second long side surfaces 111 and 112, a lower surface 115 connecting the first and second long side surfaces 111 and 112 to the first and second short side surfaces 113 and 114 at a bottom portion, and an upper surface 130 connecting the first and second long side surfaces 111 and 112 to the first and second short side surfaces 113 and 114 at a top portion. Here, the upper surface 130 may substantially correspond to the upper surface of the cap plate 130, which will later be described.

The electrode assembly 120 is provided by winding or laminating a stack of a first electrode plate 121, a separator 122, and a second electrode plate 123, which includes thin plate or layers. Here, the first electrode plate 121 may serve as a positive electrode and the second electrode plate 123 may serve as a negative electrode, or vice versa.

The first electrode plate 121 includes a first current collector plate 121a including a metal foil or mesh made of aluminum or an aluminum alloy, a first coating portion 121b provided by coating a first electrical active material, such as a transition metal oxide, on the first current collector plate 121a, a first non-coating portion (a first uncoated portion) 121c that is not coated with the first electrical active material, and a first current collector tab 121*d* extending outwardly (upwardly) from the first non-coating portion 121*c* and electrically connected to the first terminal 140. Here, the first current collector tab 121*d* becomes a path of current between the first electrode plate 121 and the first terminal 140.

The second electrode plate 123 includes a second current collector plate 123*a* including a metal foil or mesh made of copper, a copper alloy, nickel or a nickel alloy, a second coating portion 123*b* provided by coating a second electrical active material, such as graphite or carbon, on the second current collector plate 123*a*, a second non-coating portion (a second uncoated portion) 123*c* that is not coated with the second electrical active material, and a second current collector tab 123*d* extending outwardly (upwardly) from the second non-coating portion 131*c* and electrically connected to the second terminal 150. Here, the second current collector tab 123*d* becomes a path of current between the second electrode plate 123 and the second terminal 150.

The separator 122 may be positioned between the first electrode plate 121 and the second electrode plate 123 to prevent an electrical short from occurring therebetween, and allows lithium ions to move. In addition, the separator 122 may include polyethylene, polypropylene, or a composite film of polyethylene and polypropylene, but the present invention does not limit the material of the separator 122 to those disclosed herein.

Meanwhile, a winding axis of the electrode assembly 120 is located to be substantially parallel or horizontal with terminal axes of the first and second terminals 140 and 150. Here, the winding axis and the terminal axes may mean axes located in vertical directions, as shown in FIGS. 2B and 2C. It will be understood that when the winding axis and terminal axes are referred to as being substantially parallel or horizontal with each other, the winding axis and terminal axes may not meet each other even if they are extended long, or may meet each other when they are extended extremely long.

In addition, as described above, the first current collector tab 121*d* is positioned between the electrode assembly 120 and the first terminal 140, and the second current collector tab 123*d* is positioned between the electrode assembly 120 and the second terminal 150. That is to say, the first current collector tab 121*d* is extended from a top end of the electrode assembly 120 to the first terminal 140 to then be connected or welded. In addition, the second current collector tab 123*d* is extended from the top end of the electrode assembly 120 to the second terminal 150 to then be connected or welded.

As described above, the first current collector tab 121*d* may be the first non-coating portion 121*c* of the first electrode plate 121, which is not coated with the first active material, or a separate member connected to the first non-coating portion 121*c*. Here, a material of the separate member may be one selected from the group consisting of aluminum, an aluminum alloy, nickel, a nickel alloy, copper, a copper alloy, and equivalents thereof.

In addition, the second current collector tab 123*d* may be the second non-coating portion 123*c* of the second electrode plate 123, which is not coated with the second active material, or a separate member connected to the second non-coating portion 123*c*. Here, a material of the separate member may be one selected from the group consisting of nickel, a nickel alloy, copper, a copper alloy, aluminum, an aluminum alloy, and equivalents thereof.

As described above, since the winding axis of the electrode assembly 120 is located to be substantially parallel or horizontal with the terminal axes of the first and second terminals 140 and 150, a direction in which an electrolyte is injected may also be substantially parallel or horizontal with the winding axis. Therefore, the electrode assembly 120 may demonstrate excellent electrolyte wettability during electrolyte injection, and internal gases of the electrode assembly 120 may rapidly move toward a safety vent 136, thereby allowing the safety vent 136 to operate quickly.

In addition, since the first and second current collector tabs 121*d* and 123*d* (non-coating portions or separate members) of the electrode assembly 120 are directly electrically connected to the first and second terminals 140 and 150, respectively, to shorten electrical paths, internal resistance of each of the battery cells 100 can be reduced and the number of components can also be reduced.

The electrode assembly 120 can be accommodated in the case 110 with an electrolyte. The electrolyte may include a lithium salt, such as, $LiPF_6$ or $LiBF_4$, dissolved in an organic solvent, such as EC, PC, DEC, EMC, or DMC. In addition, the electrolyte may be in a liquid, solid or gel phase.

The cap plate 130 is substantially shaped of a rectangle having a length (equal to a length of each of long side surfaces 131) and a width (equal to a width of each of short side surfaces 132, and is coupled to the case 110. That is to say, the cap plate 130 seals the opening of the case 110 and may be located using the same material with the case 110. The cap plate 130 may be coupled to the case 110 by, for example, laser and/or ultrasonic welding. Here, the cap plate 130 may also be referred to as a cap assembly in some cases.

The cap plate 130 includes a plug 134 closing an electrolyte injection hole 133 and a safety vent 136 closing a vent hole 135. In addition, the safety vent 136 may further include a notch 136*a* configured to be easily opened at a preset pressure.

In addition, the cap plate 130 further includes a fuse part 137 electrically connected to the first current collector tab 121*d* of the electrode assembly 120, and a terminal fixing part 138 constraining the first terminal 140. That is to say, the cap plate 130 includes at least one (e.g., two in the illustrated embodiment) fuse part 137 downwardly extending a predetermined length and protruding from the cap plate 130, and at least one (e.g., two in the illustrated embodiment) terminal fixing part 138 upwardly extending a predetermined length and protruding from the cap plate 130.

Here, the fuse parts 137 are located at opposite sides in a widthwise direction of the cap plate 130 (i.e., in a y-y direction), and the terminal fixing parts 138 are located at opposite sides in a lengthwise direction of the cap plate 130 (i.e., in an x-x direction), respectively.

The first terminal 140 includes a first terminal plate 141 positioned on the upper surface of the cap plate 130, a first insulation plate 142 positioned on a lower surface of the cap plate 130, and a first current collector plate 143 positioned on a lower surface of the first insulation plate 142.

The first terminal plate 141 is shaped of a substantially solid hexahedron and is fixed to the upper surface of the cap plate 130 through the terminal fixing part 138. To this end, the terminal fixing parts 138 are located at opposite sides of the first terminal plate 141, for example, in the lengthwise direction of the cap plate 130 (i.e., in the x-x direction) to constrain left and right side surfaces of the first terminal plate 141. In addition, the terminal fixing part 138 is laser or ultrasonic welded to the first terminal plate 141, thereby fixing the terminal fixing part 138 and the first terminal plate 141 to each other.

The first insulation plate 142 has a substantially hexahedral shape and is coupled to the fuse parts 137 downwardly extending and/or protruding from the lower surface of the cap plate 130. To this end, fuse penetration holes 142a are located in the first insulation plate 142. That is to say, the fuse parts 137 are located in the widthwise direction of the cap plate 130 (that is, in the y-y direction), and the fuse penetration holes 142a are located at locations of the first insulation plate 142 corresponding to the fuse parts 137. The fuse parts 137 are coupled to the fuse penetration holes 142a. Here, fuse penetration cutting grooves, instead of the fuse penetration holes 142a, may be located.

The first current collector plate 143 has a substantially hexahedral shape and is coupled to the fuse parts 137. To this end, fuse penetration holes 143a are located in the first current collector plate 143 in the widthwise direction of the cap plate 130 (i.e., in the y-y direction). The fuse parts 137 are fixed to the fuse penetration holes 143a of the first current collector plate 143 by, for example, welding, caulking or riveting while being coupled to the fuse penetration holes 143a. Here, fuse penetration cutting grooves, instead of the fuse penetration holes 143a, may be located.

In addition, the first current collector tab 121d extending from the electrode assembly 120 is connected to the first current collector plate 143. That is to say, the first current collector tab 121d is welded to the first current collector plate 143 by laser or ultrasonic welding. Here, since the first current collector plate 143 and the first current collector tab 121d are both made of aluminum or an aluminum alloy, they can be easily electrically/mechanically connected to each other.

In this way, the first current collector tab 121d of the electrode assembly 120, the cap plate 130 (including the case 110) and the first terminal 140 may have the same polarity. That is to say, since the first current collector tab 121d of the electrode assembly 120, the first current collector plate 143 of the first terminal 140, the fuse parts 137 of the cap plate 130, the cap plate 130, and the first terminal plate 141 of the first terminal 140 are all electrically connected to one another, they will have the same polarity.

As described above, not only the cap plate 130 and the fuse parts 137 but also the first current collector plate 143 and the first terminal plate 141 may be made of aluminum or an aluminum alloy.

When the battery pack 100 is externally short-circuited, short-circuit current may flow from the electrode assembly 120 through the first current collector tab 121d, the first current collector plate 143 of the first terminal 140, the fuse parts 137 of the cap plate 130, the cap plate 130 and the first terminal plate 141 of the first terminal 140. Here, since the fuse parts 137 have relatively small sectional areas, the fuse parts 137 located in the cap plate 130 may be fused and broken, thereby securing the safety of the battery pack 100. Moreover, since the fuse parts 137 are mostly coupled to the fuse penetration holes 142a of the first insulation plate 142 so as not to be exposed, flame or arc generated when the fuse parts 137 are fused/broken may not affect exterior sides of the first insulation plate 142. Therefore, even when the fuse parts 137 are fused and broken, the internal space of the battery pack 100 can be stably maintained.

In addition, when the battery pack 100 is overcharged, overcharge current may be supplied to the electrode assembly 120 through the first terminal plate 141 of the first terminal 140, the cap plate 130, the fuse parts 137 of the cap plate 130, the first current collector plate 143 and the first current collector tab 121d, so that the fuse parts 137 located in the cap plate 130 are fused to then be broken, thereby securing the safety of the battery pack 100.

The second terminal 150 includes a second terminal plate 151 positioned on the upper surface of the cap plate 130, a second insulation plate 152 positioned on the lower surface of the cap plate 130, a second current collector plate 153 positioned on a lower surface of the second insulation plate 152, and a current collection pillar 154 penetrating the cap plate 130 from the second current collector plate 153 to then be fixed to the second terminal plate 151. In addition, the second terminal 150 includes a second terminal plate 151, a current collection pillar 154, and an upper insulation plate 155 interposed between the cap plate 130 and the second terminal 150. Moreover, the second terminal 150 includes a second current collector plate 153, a current collection pillar 154, and a seal gasket 156 interposed between the cap plate 130 and the second terminal 150.

In practice, the second current collector plate 153 and the second current collection pillar 154 are integrally located, and the second current collector tab 123d is connected to the second current collector plate 153. Since the second current collector plate 153 and the second current collection pillar 154 are made of copper or a copper ally, the second current collector tab 123d made of copper, a copper alloy, nickel or a nickel alloy, may be easily electrically/mechanically connected to the second current collector plate 153.

The second terminal plate 151 is also positioned on the cap plate 130 and has a hole 151a. In addition, the current collection pillar 154 is coupled to the hole 151a and then welded. A boundary region between the upwardly exposed current collection pillar 154 and the second terminal plate 151 is fused to each other by supplying, for example, laser beams, to the boundary region, followed by cooling, thereby achieving welding.

Next, the cell frame 200 is located to cover the upper surface 130, the lower surface 115, the first short side surface 113 and the second short side surface 114 of the battery cells 100. Here, the battery cells 100 are accommodated in the cell frame 200 while the upper surface 130 is upwardly exposed.

That is to say, the cell frame 200 is configured to cover and accommodate the lower surface 115, the first short side surface 113 and the second short side surface 114 of the battery pack. In detail, the cell frame 200 include a pair of side plates 201 for supporting the first and second short side surfaces 113 and 114 of the battery cells 100, and a pair of end plates 202 for supporting the first and second long side surfaces 111 and 112 of the battery cells 100. Only a first half of the end plates 202 is shown in FIG. 1.

Referring to FIG. 1, the lower surface 115 of the battery cells 100 comes into contact with a lower surface of the cell frame 200 and the upper surface thereof is exposed to the outside through the opening of the cell frame 200. Accordingly, the battery cells 100 can be easily and rapidly inserted into or extracted from the cell frame 200. The end plates 202 of the cell frame 200 are located to have substantially planar plate shapes and are coupled to opposite sides of the side plates 201 of the cell frame 200 to support the battery cells 100 at once. The end plates 202 and the side plates 201 may be fastened by, for example, welding, such as laser welding, or bolt engagement, but aspects of the present invention are not limited thereto.

In addition, as shown in FIG. 3, when viewed from the top surface 130 of the battery cells 100, the end plates 202 further include substantially pillar-shaped protrusions 203 protruding in a direction opposite to a direction in which the end plates 202 face the long side surfaces 112 and 112 of the battery cells 100, that is, in an outward direction of the cell frame 200. The protrusions 203 may have circular or rectangular sectional shapes. As shown in FIG. 3, the protrusions 203 may be shaped of rectangles such that first surfaces thereof facing the battery cells 100 are opened. Alternatively, the protrusions 203 may have various sectional shapes in addition to those disclosed herein.

In addition, the end plates 202 further include a recess 204 located between the opposite protrusions 203 and depressed in a direction of the long side surfaces 111 and 112 of the battery cells 100. The recess 204 is depressed toward the battery cells 100 in view of the outermost surfaces of the protrusions 203, so that it has an inverted U-shaped configuration as a whole, as shown in FIG. 3. The recess 204 provides an extra space for swelling of the battery cells 100.

Referring to FIG. 3, since the recess 204 is inwardly depressed a predetermined distance L1 from the outer surface of the battery pack, the battery cells 100 may have a swelling space corresponding to the distance L1 in the direction of their long side surfaces. That is to say, in the battery pack according to the embodiment of the present invention, since there is a swelling space as much as the distance L1 in the direction of the long side surfaces of the battery cells 100, the outline dimension of the battery pack module is not affected even if the battery cells 100 are inflated due to swelling.

Referring to FIG. 5, the end plates 202 include supports 205 centrally located at the protrusions 203 to fix the battery pack to an external device.

The supports 205 may include bolts having screws located at their lower portions, and are preferably shaped of a cylinder having a predetermined diameter to maintain rigidity of the end plates 202.

Referring back to FIG. 5, the supports 205 may have cut regions near to the battery cells 100 to have planes parallel with the long side surfaces of the battery cells 100. Accordingly, the cross sections of the supports 205 nearest to the battery cells 100 may become planarly cut surfaces, and the supports 205 may become farther from the long side surfaces of the battery cells 100 than in a case where the supports 205 have circular cross sections without cut regions, thereby providing an extra distance L2, as shown in FIG. 5.

Accordingly, even if swelling occurs to the battery cells 100, extra spaces as much as the distance L2 are created at ends of the long side surfaces of the battery cells 100.

While the supports 205 shaped of solid cylinders are illustrated, they may be shaped of, for example, hollow pipes.

Referring back to FIG. 1, the recess 204 of the end plates 202 may include several embossed creases located in the same direction. The creases are provided for supporting lateral rigidity of the end plates 202, and the embossed creases as well as the protrusions 203 of the end plates 202 and the supports 205 may have a predetermined thickness to function to support the end plates 202. Here, the embossed creases are preferably located in a direction perpendicular to the protrusions 203 and the supports 205. In addition, a distance between the outline dimension of the embossed creases of the recess 204 or each of the long side surface of the battery pack and the outermost one of the embossed creases is preferably smaller than a distance between the outline dimension of the protrusions 203 of the end plates 202 or each of the long side surfaces of the battery pack and the outmost one of the protrusions 203 of the end plates 202, and a difference in the distance is preferably as much as the distance L1 that is an extra space for swelling, as shown in FIG. 3 or 4.

Referring to FIGS. 3 and 4, the protrusions 203 of the end plates 202 may include extending parts located to extend toward the side plates 201. The extending parts may overlap with some regions of the side plates, preferably ends of the side plates, to then be coupled thereto. The extending parts of the protrusions 203 may be coupled to the ends of the side plates by bolt engagement or welding, such as laser welding.

In the embodiment of the present invention, as shown in FIG. 3, the extending parts of the protrusions 203 and the ends of the side plates 201 overlap each other to then be coupled to each other at exterior sides of the protrusions 203.

In the embodiment of the present invention, as shown in FIG. 4, the extending parts of the protrusions 203 and the ends of the side plates 201 overlap each other to then be coupled to each other at exterior sides of the shorter side surfaces of the battery cells 100.

The cell frame 200 may further include internal partitions 206 for separately fixing battery cells 100 to independently accommodate the battery cells 100.

FIGS. 6(a) and 6(b) illustrate views for comparison of swelling phenomena occurring to the battery pack according to an embodiment of the present invention and a conventional battery pack.

FIG. 6(a) illustrates a distorted state of the conventional battery pack when swelling occurs to battery cells. Referring to FIG. 6(a), in the conventional battery pack, in which a recess is not located in end plates, if swelling occurs to the battery cells, the end plates are pushed out as much as swollen volumes of the battery cells. Then, the outline dimension of the conventional battery pack may increase as the swollen volumes.

FIG. 6(b) illustrates a distorted state of the battery pack according to an embodiment of the present invention when swelling occurs to battery cells. Referring to FIG. 6(b), even if the end plates are pushed out as much as swollen volumes of the battery cells as the battery pack is inflated due to swelling occurring to the battery cells, the volume of the end plates pushed out may be taken in the extra space provided in the end plates. Therefore, there is no change in the overall outline dimension of the battery pack.

As described above, in the battery pack according to the embodiment of the present invention, even if the battery cells are inflated due to swelling, the end plates are not pushed out by the extra space provided therein, so that the outline dimension of the battery pack is not affected, thereby allowing the battery pack to be used in a secured manner.

Figure 7:
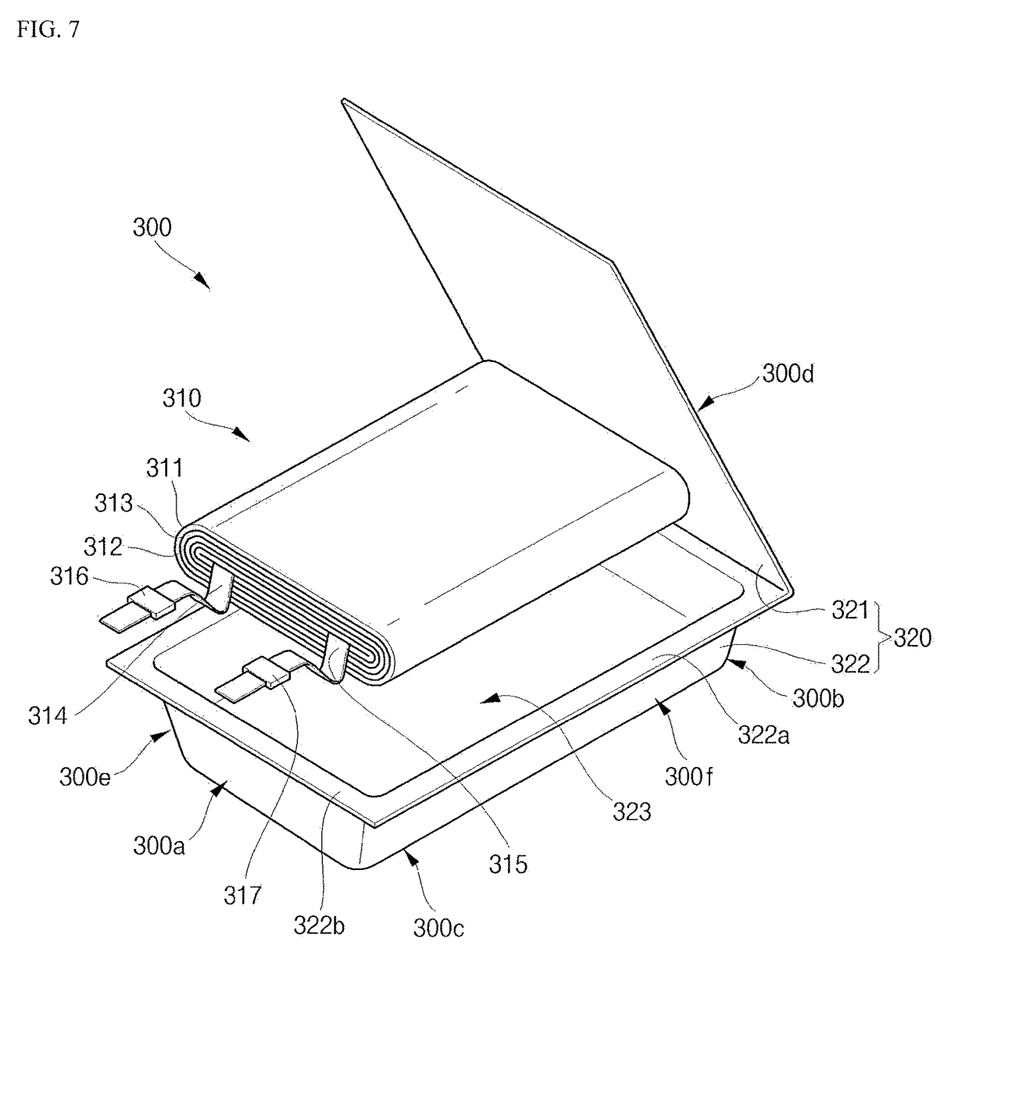
FIG. 7 is an exploded perspective view of a cell in the battery pack according to another embodiment of the present invention.

FIG. 7 is an exploded perspective view of a cell in the battery pack according to another embodiment of the present invention. That is to say, FIG. 7 illustrates a pouch type battery as a battery cell 300.

The battery cell 300 may include an electrode assembly 310 and a case (pouch) 320 accommodating the electrode assembly 310. The electrode assembly 310 is provided by winding or laminating a stack of a first electrode plate 311, a separator 313, and a second electrode plate 312. Here, the first electrode plate 311 may be a positive electrode and the second electrode plate 312 may be a negative electrode, or vice versa.

When the first electrode plate 311 is a positive electrode, it is produced by coating a first active material layer on both surfaces of a first current collector made of a highly conductive metal plate, for example, an aluminum (Al) foil. A first electrode tab 314 is located at a first non-coating portion where the first active material layer of the first electrode plate 311 is not coated. One end of the first electrode tab 314 is electrically connected to the first non-coating portion and the other end thereof is drawn out from the case 320. In addition, an insulation tape 316 is attached to a region of the first electrode tab 314 contacting the case 320.

When the second electrode plate 312 is a negative electrode, it is produced by coating a second active material layer on both surfaces of a second current collector made of a conductive metal plate, for example, a copper (Cu) or nickel (Ni) foil. A second electrode tab 315 is located at a second non-coating portion where the second active material layer of the second electrode plate 312 is not coated. One end of the second electrode tab 315 is electrically connected to the second non-coating portion and the other end thereof is drawn out from the case 320. In addition, an insulation tape 317 is attached to a region of the second electrode tab 315 contacting the case 320.

The separator 313 is positioned between the first electrode plate 311 and the second electrode plate 312 and prevents a short circuit between the first and second electrode plates 311 and 312.

The case 320 includes an upper case 321 and a lower case 322, which are produced by folding one side of an integrally shaped parallelepiped pouch layer midway in a lengthwise direction. A groove 323, in which the electrode assembly 310 is to be accommodated, is provided in the lower case 322 by pressing. In addition, opposite-side sealing parts 322 and one-side sealing part 322b are provided in the lower case 322 to be sealed with the upper case 321 along three sides of the groove 323, except for one side in which the upper case 321 and the lower case 322 are in contact with each other.

After the electrode assembly 310 is accommodated in the groove 323 of the lower case 322, the case 320 is sealed by thermally fusing the sealing parts 322a and the sealing part 322b in a state in which the upper case 321 and the lower case 322 are brought into close contact with each other. Then, the side-surface sealing part 322a, except for the sealing parts 322b, from which the first and second electrode tabs 314 and 315 of the battery cell 300 protrude, is bent toward side surfaces of the lower case 322.

Meanwhile, the battery cell 300 includes a top surface 300a from which the first and second electrode tabs 314 and 315 are drawn out, a bottom surface 300b facing the top surface 300a, and a pair of first and second long side surfaces 300c and 300d having a relatively large area and a pair of first and second short side surfaces 300e and 300f having a relatively small area, among surfaces connecting the top surface 300a and the bottom surface 300b.

The cell frame 200 may be provided to cover the top surface 300a, the bottom surface 300b, the first short side surface 300e and the second short side surface 300f of the battery cell 300. The battery cell 300 may be accommodated in the cell frame 200 while the top surface 300a is upwardly exposed. That is to say, the cell frame 200 may be configured to accommodate the battery cell 300 while enclosing the bottom surface 300b, the first short side surface 300e and the second short side surface 300f. In detail, the cell frame 200 may include side plates 201 for supporting the first and second short side surfaces 300e and 330f of a plurality of battery cells 300 and end plates 202 for supporting the first and second long side surfaces 300c and 300d of the battery cells 300. Since organic connection relationships between the other battery cells and the cell frame are substantially the same as described above, additional descriptions will not be given.

Although the foregoing embodiments have been described to practice the battery pack of the present invention, these embodiments are set forth for illustrative purposes and do not serve to limit the invention. Those skilled in the art will readily appreciate that many modifications and variations can be made, without departing from the spirit and scope of the invention as defined in the appended claims, and such modifications and variations are encompassed within the scope and spirit of the present invention.

BRIEF EXPLANATION OF ESSENTIAL PARTS OF THE DRAWINGS

| 100: Battery cell | |
| --- | --- |
| 200: Cell frame | 201: Side plates |
| 202: End plates | 203: Protrusions |
| 204: Recess | 205: Support |

The invention claimed is:

1. A battery pack comprising:
a plurality of battery cells, each of the plurality of battery cells including:
an upper surface through which a pair of electrode terminals are protruded,
a lower surface facing the upper surface, and
a pair of long side surfaces and a pair of short side surfaces among surfaces connecting the upper surface and the lower surface, the pair of long side surfaces having a relatively large area, and the pair of short side surfaces having a relatively small area; and
a cell frame that receives the plurality of battery cells, the cell frame exposes the upper surfaces of the plurality of battery cells, and includes:
side plates for supporting the short side surfaces of the plurality of battery cells, and
end plates positioned between the side plates to support the long side surfaces of the plurality of battery cells, each of the end plates including:
a base plate in parallel to the long side surfaces of the plurality of battery cells,
a pair of protrusions protruding from both ends of the base plate adjacent to the side plate, the pair of protrusions extending along lengths of both ends of the base plate, each of the pair of protrusions having:
first, second, and third surfaces perpendicular and connected to each other, the first surfaces of the pair of protrusions extending perpendicularly from the base plate and facing each other, and a volumetric space surrounded by the first, second, and third surfaces, and
a recess located between the volumetric spaces of the pair of protrusions, the recess being in a direction oriented toward the long side surfaces of the plurality of battery cells.

2. The battery pack of claim 1, wherein the end plates include cylindrical supports located in the pair of protrusions to fixedly support the battery pack to an external device.

3. The battery pack of claim 2, wherein the cylindrical supports have cut portions located near to the plurality of battery cells to have planes parallel with the long side surfaces of the plurality of battery cells.

4. The battery pack of claim 1, wherein the recess of each of the end plates includes several embossed creases located in the same direction, and a distance between each of the long side surfaces of the plurality of battery cells and the outermost one of the embossed creases is smaller than a distance between each of the long side surfaces of the plurality of battery cells and each of the pair of protrusions.

5. The battery pack of claim 1, wherein each of the pair of protrusions in each of the end plates includes extending parts located to extend toward the side plates, the extending parts overlapping with regions of the side plates.

6. The battery pack of claim 5, wherein the extending parts of the end plates and the regions overlapping with the side plates are located at exterior sides of the plurality of battery cells.

7. The battery pack of claim 1, wherein the plurality of battery cells are prismatic secondary batteries.

8. The battery pack of claim 1, wherein each of the plurality of battery cells is provided by winding an electrode assembly including a first electrode plate, a second electrode plate, and a separator positioned between the first electrode plate and the second electrode plate.

9. The battery pack of claim 1, wherein the cell frame accommodates the plurality of battery cells such that lower surfaces of the plurality of battery cells face a bottom side of the cell frame to upwardly expose upper surfaces of the plurality of battery cells, the short side surfaces of the plurality of battery cells face the side plates of the cell frame, and long side surfaces of outermost ones among the plurality of battery cells face the end plates of the cell frame.

10. The battery pack of claim 9, wherein the cell frame includes a plurality of internal partitions for independently accommodating the plurality of battery cells.

11. The battery pack of claim 1, wherein the base plate is continuous and integral with the pair of protrusions.

12. The battery pack of claim 1, wherein each of the end plates includes a cylindrical support within the volumetric space.

13. The battery pack of claim 1, wherein the pair of protrusions and the recess directly face an exterior of the battery pack.

14. The battery pack of claim 1, wherein the pair of protrusions have quadrangular cross sections in a top view.

15. The battery pack of claim 1, wherein the third surfaces of the pair of protrusions are parallel to and overlap respective side plates of the cell frame, the first and third surfaces being parallel to each other.

16. The battery pack of claim 1, wherein a depth of the recess equals a depth of the volumetric space, the depths of the recess and volumetric space being measured along a same direction.

17. The battery pack of claim 1, wherein an entirety of each of the pair of protrusions extends along an entire height of the base plate in a direction normal to the lower surfaces of the plurality of battery cells.

* * * * *